United States Patent Office 3,521,839
Patented July 28, 1970

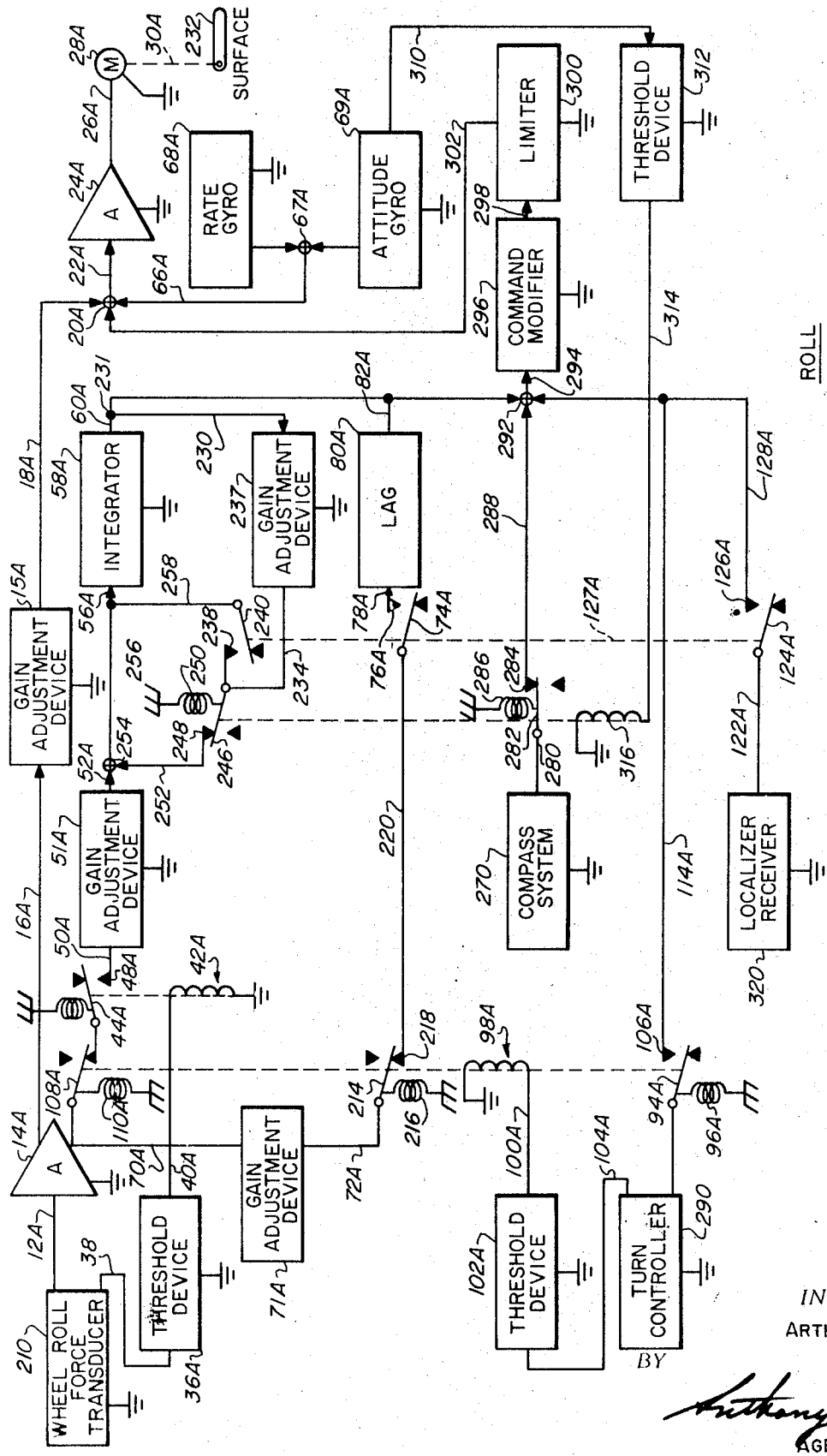

3,521,839
CONTROL APPARATUS FOR AIRCRAFT
Arthur C. Diani, Clifton, N.J., assignor to The Bendix Corporation, a corporation of Delaware
Filed Oct. 2, 1967, Ser. No. 672,203
Int. Cl. B64c 13/18
U.S. Cl. 244—77    11 Claims

ABSTRACT OF THE DISCLOSURE

Apparatus for manually supplementing automatic control of an aircraft. The aircraft control wheel is equipped with pitch and roll transducers for providing electrical signals corresponding to pilot applied force, and which signals effect alternatively the displacement or displacement rate of an aircraft control surface. An anticipation signal is provided for breaking the at rest inertia of the control surface when the pilot applies force to the control wheel.

BACKGROUND OF THE INVENTION

Field of the invention

This invention relates to aircraft control apparatus and, particularly, to apparatus for controlling the craft through the control wheel while the craft is under the influence of an automatic control system.

Prior art of the invention

Aircraft are equipped with controllers so that the craft may be manually controlled about the pitch and roll axes when the craft is under the influence of an automatic control system. It is desirable, however, to provide for manual control through the most familiar and natural element, the control wheel.

Prior to the present invention configurations providing supplemental control wheel steering have not been completely acceptable because of wheel nibble and oscillations upon force being exerted on the control wheel by the pilot. Moreover, the tendency is for the pilot to overpower the autopilot servo providing undesirable effects.

The present invention overcomes the aforementioned disadvantages by providing a configuration whereby the pitch and roll of the aircraft may be varied in a rate mode and wherein the displacement rate of the control surfaces of the aircraft corresponds to the force applied by the pilot to the control wheel. Pitch and roll may also be varied in a displacement mode and wherein the displacement of the control surfaces corresponds to the force applied by the pilot to the control wheel.

The device of the present invention overcomes the tendency of the pilot to overpower the autopilot by providing an anticipation signal of proper sense which leads the command signal upon force being exerted on the control wheel. The anticipation signal breaks the at rest inertia of the servomotor and the surface controlled thereby.

SUMMARY OF THE INVENTION

The invention contemplates control wheel steering of an aircraft about pitch and roll axes when the aircraft is under the influence of automatic control. The control wheel is equipped with force transducers for providing command signals corresponding in magnitude and sense to the force applied by the pilot to the wheel, and which command signals may alternatively effect upon control surfaces a displacement from a reference position or a displacement rate, either of which cause aircraft to change heading from a reference heading, said displacement and displacement rate corresponding to the pilot applied force. When the displacement of the control surface is effected, the control surfaces are driven so that the aircraft resumes the reference heading and the aircraft control surfaces thereafter resume reference position upon removal of the pilot applied force from the control wheel; and when the displacement rate is effected, the control surfaces are driven so that the aircraft retains the new heading and the aircraft surfaces resume the reference position upon removal of said force.

One object of this invention is to provide command signals corresponding in magnitude and sense to the force applied by the pilot to the control wheel of an aircraft, and which signals supplement signals provided by an automatic control system.

Another object of this invention is to effect upon aircraft control surfaces a displacement from a reference position, and which displacement corresponds to the pilot applied force.

Another object of this invention is to return the control surfaces to the reference position upon removal of said pilot applied force.

Another object of this invention is to effect upon aircraft control surfaces a displacement rate, and which displacement rate corresponds to the pilot applied force.

Another object of this invention is to change the new heading of the aircraft from a reference heading by displacing control surfaces at a rate corresponding to the pilot applied force and to maintain the new aircraft heading upon removal of the force.

Another object of this invention is to supplement automatic control of an aircraft in proportion to the force applied by the pilot to the control wheel of the craft.

Another object of this invention is to provide control wheel steering apparatus, in combination with pitch and roll controls, for changing aircraft attitude when the craft is under the influence of an automatic pilot.

These and other objects and features of the invention are pointed out in the following description in terms of the embodiments thereof which are shown in the accompanying drawings. It is to be understood, however, that the drawings are for the purpose of illustration only and are not a definition of the limits of the invention, reference being had to the appended claims for this purpose.

DESCRIPTION OF THE DRAWINGS

Referring to the drawings in which corresponding numerals indicate corresponding parts in the several views:

FIG. 2 is a block diagram of the present invention applied to control an aircraft about the roll axis.

DESCRIPTION OF THE INVENTION

Figure 1:
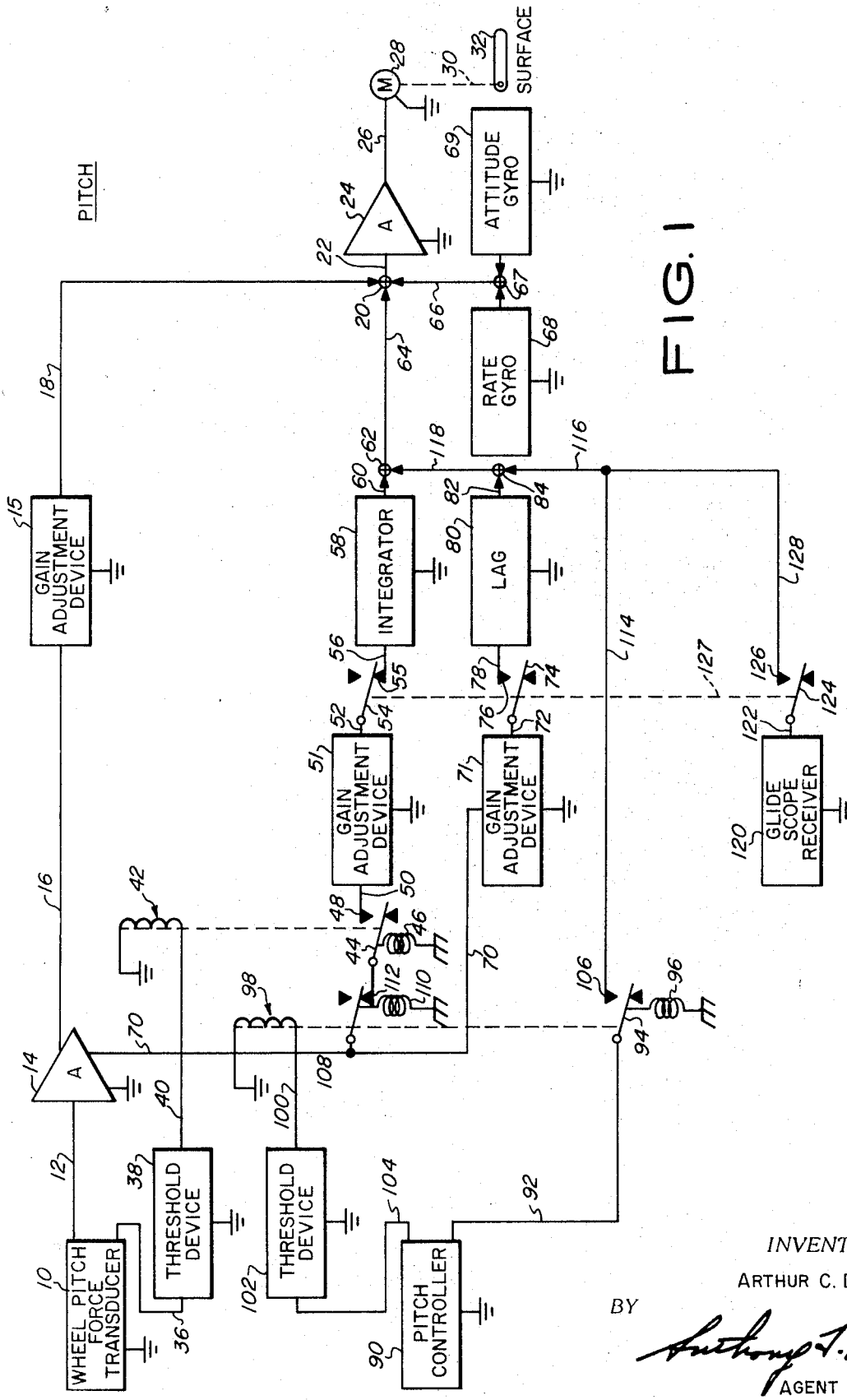
FIG. 1 is a block diagram of the present invention applied to control an aircraft about the pitch axis.

Referring to apparatus as shown in FIG. 1, a pitch force transducer 10 of conventional type is suitably mounted to the control wheel (not shown) of an aircraft and provides a signal at an output conductor 12 leading therefrom, and which signal has a magnitude and sense corresponding to the force applied by the pilot to the control wheel for controlling the aircraft about the pitch axis. The conductor 12 is connected to an amplifier 14 for impedance matching, and therefrom through an output conductor 16 to an attenuating or gain adjustment device 15, which may for purposes of example, be a voltage divider, having an input-output gradient to reduce control wheel nibble when the pilot applied force is held constant.

Gain adjustment device 15 is connected through an output conductor 18 to a summing device 20 and which summing device 20 combines the signals applied thereto and provides at an output conductor 22 a signal which is applied to a servo amplifier 24. The servo amplifier 24 is operatively connected through a line 26 to a servomotor 28 which drives, through a mechanical linkage 30, the aircraft pitch control surface or elevator 32.

In order to prevent response to slight forces applied to the transducer 10 as a result of spurious and unintended movements of the pilot's hands resting on the control wheel, a threshold device 38 is connected to transducer 10 through a conductor 36. Threshold device 38 is responsive to the output of transducer 10 for providing a signal of constant magnitude at an output conductor 40 whenever the signal from transducer 10 at the conductor 36, and which signal is proportional to pilot applied force, exceeds a predetermined threshold value.

The conductor 40 is connected to a relay 42 which controls the position of a switch 44 normally biased by a mechanical spring 46 to an open circuit position as shown in FIG. 1. Upon relay 42 being energized, switch 44 is moved into engagement with a relay contact 48 connected by a line 50 to a gain adjustment device 51 which, for purposes of example, may be a voltage divider having an input-output gradient to prevetn control surface oscillations when the pilot applied force is being held constant. Gain adjustment device 51 is connected through an output conductor 52, a contact 55 of a switch 54 and a conductor 56 to an integrator 58 which may be an electromechanical type well known in the art. Integrator 58 provides a signal which increases at a rate proportional to the signal from gain adjustment device 51.

Integrator 58 is connected through a conductor 60 to summing device 62 which sums the signals applied thereto and provides a summation signal at an output conductor 64. The summation signal is applied through the output conductor 64 to the summing device 20, and which summing device 20 is connected by a conductor 66 to a summing device 67. Summing device 67 sums the signals from a pitch rate gyro 68 and from a pitch attitude gyro 69 to provide a summation signal at the conductor 66. The attitude gyro 69 and the rate gyro 68 provide signals corresponding to displacement of the craft from a preselected pitch reference and the displacement rate, respectively.

In the device of the present invention the signal from force transducer 10 may be used in a force-displacement mode in which displacement of the aircraft control surface is proportional to the pilot applied force. With reference to FIG. 1, an output conductor 70 leading from the amplifier 14 is connected to a suitable gain adjusting device 71, which may be, for purposes of example be a voltage divider, to provide an input-output signal gradient so that slight variations of signal magnitude on line 70 are damped with the damped signal appearing at an output conductor 72. The output conductor 72 is connected to a switch 74 shown in open position and which switch 74 is closed in a manner to be hereinafter explained to engage a contact 76 connected by a conductor 78 to a lag circuit 80 of conventional type. Lag circuit 80 has a time constant selected to be compatible with aircraft response when the craft follows a radio beam to approach a runway and land.

In anticipation of continued use of pitch controllers on aircraft, i.e., manual pitch control by means other than the control wheel, a conventional type pitch controller 90 is provided and whereby manipulation of pitch controller 90 disconnects the control wheel steering channel including gain adjustment device 51 and integrator 58. A conductor 92 leads from pitch controler 90 to a switch 94 normally biased in the open position by the spring 96 as shown in FIG. 1, and which switch 94 is automatically closed upon engagement with a contact 106 when a relay 98 is energized. The relay 98 is energized by a signal at a conductor 100 leading from a threshold device 102. Threshold device 102 is connected by a line 104 to pitch controller 90 and is responsive upon the signal from pitch controller 90 exceeding a predetermined threshold to provide the signal at conductor 100 for energizing relay 98. Upon energization of relay 98, a switch 108, biased by a spring 110 to a closed position and in engagement with a contact 112, is moved to an open position. When switch 108 is open, control wheel steering through gain adjustment device 51 and integrator 58 is prohibited. Integrator 58 then stores a signal corresponding to the signal from gain adjustment device 51 just prior to opening switch 108 .

Contact 106 of switch 94 is connected through a conductor 114 and a conductor 116 leading to summing device 84. Since, upon manipulation of pitch controller 90 switch 108 is opened as heretofore explained and switch 74 is open, the signal from summing device 84 on an output conductor 118 is the same as the signal at conductor 116 so that the signal at conductor 64 leading from summing device 62 is the summation of the signal from pitch controller 90 and the stored signal from integrator 58. The signal from integrator 58 is a constant signal having a magnitude and sense corresponding to the magnitude and sense of the signal from gain adjustment device 51 at the instant just prior to that when switch 108 was moved to open circuit relation by relay 98.

In order to illustrate the use of the present invention during a beam coupled approach and landing maneuver, i.e., when the craft follows a radio beam to touchdown, a glide slope receiver 120 of conventional type is shown in FIG. 1. Glide slope receiver 120 provides at an output conductor 122 a signal having a magnitude and sense corresponding to the displacement of the craft from a glide slope beam. The conductor 122 is connected to switch 124 shown open in FIG. 1, and which switch 124 is manually operated to closed relation with a contact 126 connected by a conductor 128 to the conductor 116.

Upon the closing of the switch 124 a mechanical linkage 127 is effective to close switch 74 and to open switch 54. At this time, and thereafter until switch 54 is closed, integrator 58 effects a signal at output conductor 60 having a constant magnitude and sense corresponding to the signal at the instant switch 54 is opened. The signal from integrator 58 is equal in magnitude but opposite in sense to the pitch attitude signal from pitch attitude gyro 69 and the aircraft surface 32 is driven to streamline causing the aircraft to retain the attitude prior to the approach and landing maneuver, at which time switch 124 is closed. Thereafter control surface 32 is controlled by the signal from glide path receiver 120.

Referring to the roll attitude control apparatus as shown in FIG. 2 in which elements corresponding to like elements in the drawing of FIG. 1 are indicated by the same reference numeral with a postscript A added thereafter, a wheel roll force transducer 210 of conventional type is provided and is responsive to pilot applied force to effect a signal on an output conductor 12A leading therefrom. The signal at output conductor 12A has a magnitude and sense corresponding to the force applied by the pilot to the control wheel (not shown) to control the aircraft about the roll axis. The operation of the signal channel including amplifier 14A, conductor 16A, gain device 15A, conductor 18A and summing device 20A is similar to the corresponding signal channel heretofore described with reference to FIG. 1 and is provided to break the at rest inertia of the aileron servomotor 28A and the aileron control surface 232.

The threshold device 36A is responsive to a threshold signal at a predetermined level from a transducer 210 to effect energization through conductor 40A of the relay 42A thus engaging switch 44A with contact 48A thereby providing a conductive signal path from the output conductor 70A of amplifier 14A through the output conductor 60A of integrator 58A.

A force-displacement channel is also provided as in the pitch configuration of FIG. 1, and which channel includes a gain adjustment device 71A connected to the amplifier 14A by a conductor 70A and connected through a conductor 72A to a switch 214. Switch 214 is normally biased to a closed position by a spring 216 and into engagement with a contact 218, and which switch is actuated by a relay 98A. Switch 214 is connected to a summing point 292 through a conductor 220, a switch 74A, a conductor 78A, a lag circuit 80A and a conductor 82A. The lag circuit 80A is of conventional type having a time constant suitably selected to be compatible with the response of the pilot applied force sensed by wheel transducer 210 during beam coupled runway approach and landing, and is further provided to improve control system stability.

The apparatus shown in FIG. 2 provides for continued use of a turn controller 290 by which the pilot may vary the roll attitude of the aircraft, the arrangement being that turn controller 290 disconnects the control wheel steering channel including gain adjustment device 51A and integrator 58A in a manner similar to that described with reference to FIG. 1. In particular, threshold device 102A is responsive to a signal at and above a predetermined threshold for providing a signal at output conductor 100A causing energization of a relay 98A. Relay 98A thereupon closes a switch 94A to engagement with a contact 106A, and opens switches 214 and 108A. Control wheel steering through the channel including gain adjustment device 51A and integrator 58A and through the channel including gain adjustment device 71A is prohibited.

A localizer receiver 320 is provided for use with the invention to provide a signal corresponding to lateral displacement of the aircraft from a localizer beam. A conductor 122A leads from localizer receiver 320 to a pilot-operated switch 124A. Engagement of switch 124A with contact 126A couples the aircraft to a conductor 128A and the additional apparatus hereinafter noted so as to automatically control the aircraft.

The roll control apparatus of FIG. 2 further includes a feedback path to permit the integrator 58A to "rundown" so as to provide zero output at line 60A under the following conditions (1) when the switches 124A and 74A are moved into closed relation thereby engaging contacts 126A and 76A, respectively, thus permitting control wheel steering under a beam coupled approach through the force-displacement channel; and (2) when the pilot releases the control wheel at or less than a predetermined bank angle after a roll attitude maneuver, at which time the aircraft automatically returns to a wings level attitude as will be more fully hereinafter explained.

A feedback path is provided through a conductor 230 joining the conductor 60A at a point 231, with the conductor 230 leading to a gain adjustment device 237 which may be, for purposes of example of a voltage divider, to provide an input-output gradient of the feedback signal between the conductor 230 and a conductor 234 leading from the gain device 237. The conductor 234 is connected to a contact 238 of a switch 240 shown in open position in FIG. 2, and which switch 240 is controlled through a suitable mechanical linkage 127A by the pilot-operated switch 124A. A switch 246 is also connected to conductor 234 and is normally biased to a closed position in engagement with a contact 248 by a spring 250. The contact 248 is connected through a conductor 252 to an input of a summing device 254. Summing device 254 is connected to the conductor 52A leading from gain adjustment device 51A. The summing device 254 is operative to add signals applied thereto for effecting a summation signal at a conductor 256 which is connected to a conductor 56A and to a conductor 258 leading from the switch 240.

A compass system 270 is provided in the roll control apparatus of FIG. 2 to effect a signal at a conductor 280 corresponding to the displacement of the aircraft from a reference heading. The reference heading is the heading of the aircraft at the time when the compass is automatically engaged in the system; i.e., when switch 282, electrically connected to the compass 270 by conductor 280 and mechanically biased by spring 286 as shown in FIG. 2, is in closed relation with a contact 284 thereof. The contact 284 is connected by a conductor 288 to a summation device 292. Conductor 60A from integrator 58A and conductor 128A from contact 126A of switch 124A are connected to summing device 292. The output of the summation device 292 is connected through an output conductor 294 thereof to a conventional type command modifier 296 which functions as an amplifier for signals of changing magnitude and wherein the rate of change of said signals is less than the rate limit of the command modifier. For signals appearing at conductor 294 which are changing magnitude at a greater rate than the limit of command modifier 296, the command modifier 296 is operative to effect at conductor 298 a signal corresponding to the rate limit of command modifier 296. Further, output conductor 298 is connected to a limiter 300 which limits the signal from command modifier 296 to a limit in accordance with a predetermined bank angle and, when said limit is reached or exceeded, limiter 300 provides a constant level output corresponding to the limit thereof at an output conductor 302.

A roll gyro 68A and an attitude gyro 69A are similarly provided, as in the pitch configuration in FIG. 1, to effect signals indicative of the rate of change of aircraft roll attitude and the displacement from a reference roll attitude, respectively. The signals are summed by a summing device 67A having an output connected through a conductor 66A to a summing device 20A. Summing device 20A is connected to conductor 18A leading from gain adjustment device 15A and to conductor 302 leading from limiter 300.

The attitude gyro 69A is connected to a conductor 310 leading to a threshold device 312 which is effective, upon the signal from attitude gyro 69A exceeding a predetermined threshold, to provide a signal at an output conductor 314, and which signal energizes a relay 316 so that the relay 316 opens switches 282 and 246. The threshold device 312 provides the signal at the output conductor 314 thereof when the aircraft reaches or exceeds a predetermined attitude as detected by the attitude gyro 69A.

Normally, a pilot can only attempt to return to wings level attitude after being at some bank attitude in a controlled turn. Therefore, below the predetermined threshold limit of the threshold device 312, no signal is effected at conductor 314 and the relay 316 is deenergized reverting switch 282 back to closed relation with contact 284. A new reference compass heading is thus provided, and which new heading corresponds to the displacement of the craft at the time switches 282 and 246 revert to the positions shown in FIG. 2. At attitudes exceeding the predetermined threshold, the relay 316 is energized and disconnects the compass system 270 so as to prohibit signals from the compass system 270 from automatically controlling the aircraft heading. This is required since the compass system signals tend to maintain the aircraft at the reference heading and these signals are incompatible with an aircraft roll maneuver whether effected by control wheel steering in the force-rate mode or force-displacement mode of operation.

OPERATION

Referring to the improved pitch control apparatus of FIG. 1, the force-rate channel is in the ready state for control wheel steering so that upon a pilot force being applied to the pitch transducer 10, a signal of magnitude and sense corresponding to the said force is applied to the amplifier 14. The output of amplifier 14 is gain adjusted by gain adjustment device 15 and amplified by the amplifier 24 to initiate motion of the servomotor 28 and the pitch control surface or elevator 32 driven thereby in anticipation of the command rate signal.

When the force signal from transducer 10 exceeds the level established by threshold device 38, the relay 42 becomes energized causing the switch 44 to move into engagement with contact 48 thereby closing the force-rate channel. The signal from amplifier 14 is therefore conducted through switches 108 and 44, gain device 51, and switch 54 to cause a rate gain signal from the integrator 58 to be effected on conductors 60 and 64. No signal is applied to the other input of the summing device 62, which input leads from line 118, since all other channels are non-conductive. In particular, switches 74, 94 and 124 are in open position so that no signal is conducted through either the force-displacement channel, the pitch controller channel or the glide slope receiver channel, respectively.

The signal from integrator 58 is summed at the summing device 20 with the signal from gain device 15, which signal is minimal with respect to any rate signal, the signal from the rate gyro 68 and the attitude gyro 69, respectively. The resultant signal is applied to the control surface servo system including the amplifier 24 and servomotor 28 so as to drive the surface 32 in a direction dependent upon the sense of the signal applied to motor 28.

Since the output signal from the integrator 58 is a signal proportional to the applied force (i.e., constant force signal to integrator 58 provides an output signal constantly increasing with respect to time), the surface 32 will be displaced at a rate corresponding to the integrator signal.

Upon removal of the wheel force at a newly acquired attitude, the signal on line 36 from transducer 10 is less than the predetermined value of the threshold device 38 and the relay 42 becomes deenergized. The switch 44 therefore returns to the open position. Opening of switch ner as described, or by use of the pitch controller 90 which provides switching logic to automatically take precedence over other lateral control signal channels upon 44 causes the integrator 58 to thereafter store a signal, which signal appears on line 60 and is of constant value corresponding to the signal applied to integrator 58 at the instant the switch 44 reverts back to open position. The signal from integrator 58 is then cancelled by the signal from attitude gyro 69. The resultant zero signal from the summation device 20 causes the servomotor 28 to drive to neutral whereby the surface 32 moves to the streamline position so that the aircraft may now retain the newly acquired attitude. Thus derived is the attitude memory as a result of pilot applied force to the most natural and familiar control element, the control wheel.

Further attitude changes may be performed in the manthe predetermined signal level of the threshold device 102 being attained. The relay 98 is energized by the logic level signal from threshold device 102, and the switch 94 is immediately moved into closed relation and in engagement with the contact 106. Switch 108 is also immediately moved, but into open relation and engagement with the dummy contact thereof. Closing the switch 94 permits a signal from pitch controller 90 to pe applied through the conductors 114, 116, 118 and 64 to the summing device 20. The signal from pitch controller 90 is summed with the signals from rate gyro 68 and attitude gyro 69 and the output signal of summing device 20, as amplified by amplifier 24 commands the servomotor 28 to drive the surface 32. A constant signal from pitch controller 90 is cancelled by the signal from attitude gyro 69 upon the aircraft acquiring the new attitude and the control surface 32 is driven to streamline position as long as the signal from pitch controller 90 is maintained.

The force-rate-memory configuration has been found in flight tests to provide practical problems of overcontrol and loss of beam when the aircraft is approaching the glide slope beam intercept. To solve this problem, the improved aircraft control apparatus of the present invention includes a force-displacement channel responsive to a command signal from amplifier 14 when the pilot-operative switch 124 is moved into closed relation and engagement with the contact 126 thereby effecting through linkage 127 the closing of the switch 74 and the opening of the switch 54. The aircraft is then beam coupled and is responsive to command signals from glide slope receiver 120. The opening of the switch 54 places the force-rate channel in open circuit position with integrator 58 providing thereafter a stored signal as aforementioned, although the channel is nonresponsive to signals from amplifier 14.

A subsequent force as effected by the signal from amplifier 14 is gradient adjusted by gain device 71 and applied through lag displacement circuit 80 which provides a signal lagging the force command signal by a time constant suitably selected to be compatible with pilot acceptability to aircraft response in the approach-landing configuration. A pilot intitiated force command, appropriately lagged for control stability, causes the servo amplifier 24 to command the motor 28 to drive surface 32 to a displacement. Then, as the aircraft changes attitude, the attitude gyro provides a signal of opposite phase to cancel the force command signal thereby causing the elevator or surface 32 to return to its initial position. As a result, the aircraft holds the newly acquired attitude as a direct function of pilot force on the control wheel as sensed by the transducer 10, and the aircraft maintains the new attitude as long as the force is maintained. Subsequent removal of pilot applied force to the control wheel returns the signal from lag circuit 80 at conductor 82 to zero. The signal from attitude gyro 69, of opposite sense from the aforementioned command signal, thereupon commands motor 28 and surface 32 to be driven in opposite direction from the direction causing the initial displacement so as to cause the aircraft to return to the pre-control wheel steering pitch attitude. Thus evolved is the short term force-displacement mode pitch aircraft control operation. If the pilot desires to fly at some beam displacement, a constant force must be applied to and sensed by transducer 10 to produce a signal to cancel the signal corresponding to the beam displacement signal. The force command signal causes the aircraft to initiate a change in attitude by displacing the surface 32 driven by the motor 28. The attitude gyro 69 provides a signal cancelling the force command signal at the corresponding attitude from beam center and the aircraft thereafter is held at the new attitude and the surface 32 is driven by the motor 28 to streamline position.

Referring to FIG. 2, control wheel steering of the aircraft about the roll axis is similar to control wheel steering about the pitch axis in that the roll attitude rate signal effected at the conductor 60A leading from integrator 58A is proportional to pilot applied force sensed by the transducer 210. In particular, said pilot applied force causes a signal to be applied to amplifier 14A corresponding thereto, and which signal is applied to gain device 15A for providing an anticipation signal which breaks the at rest inertia of the aileron surface 232 driven by the servomotor 28A. A threshold device 36A is provided to effect energization of the relay 42A at a predeterminal signal level corresponding to a predetermined pilot applied force to the control wheel 210.

For aircraft roll control in the fore-displacement mode during a beam coupled approach, there is provided a pilot operative switch 124A which may be moved into closed relation placing the switches 74A and 240 into closed relation. Pilot applied force upon the wheel transducer 210, to effect a roll attitude change from a reference attitude, causes a command signal from amplifier 14A to be applied through gain device 71 and lag displacement circuit 80A, and which lag displacement circuit 80 in turn causes a lag displacement signal on conductor 82A directly proportional to the force applied to the control wheel.

A turn controller 290 is provided as an alternative means to control the aircraft, the use of which turn controller 290, through switching logic, automatically prohibits control wheel steering in either the force-rate mode or in the force-displacement mode. Upon the signal from turn controller 290 reaching a predetermined signal level, threshold device 102A effects energization of the relay 98A which closes switch 94A, opens switch 214 and opens switch 108A. The force-displacement channel and force-rate channel are thus open and nonresponsive to command signals on line 70A.

Because of the more complex roll maneuver, there is further provided means to limit roll rate and bank attitudes of the craft, and which limiting means depends upon the aircraft safe roll rate and roll attitude displacement. A compass system 270 is also included to provide an automatic heading hold signal for controlling the aileron surface 232 to maintain the aircraft at the preselected heading.

As in the pitch configuration of FIG. 1, and for operation in the force-rate mode, a force command producing a signal above the predetermined value of threshold device 36A energizes the relay 42A which closes switch 44A and the force command signal gain adjusted by gain device 51A, is applied to the integrator 58A which effects a signal proportional to applied force at conductor 60A and which signal is summed with the signal from rate gyro 68A and with the signal from attitude gyro 69A to command servomotor 28A. The rate signal is applied to a command modifier 296 adjusted to some high predetermined roll rate dependent upon the type of craft and the maximum safe roll rate thereof. The output signal from command modifier 296 is applied to limiter 300 which limits signals tending to cause the aircraft to roll beyond a safe limit.

Signals from compass system 270 tending to automatically effect aircraft heading hold are incompatible with control wheel steering about the roll axis since roll attitude displacement from wings level position necessarily implies a change in aircraft heading. In order to automatically disconnect the compass system 270, a threshold device 312 is provided which is responsive to a signal from the attitude gyro 69A corresponding to the predetermined roll attitude (for instance, 3°) from wings level to effect a logic level signal at conductor 314. The signal on line 314 energizes the relay 316 which opens switch 282. Further, switch 246 normally closed is opened for a purpose hereinafter explained. The attitude gyro 69A, therefore, provides a signal to control the switching logic so as to prohibit incompatible command signals from being conducted through the system to the servomotor 28A.

Assuming that all switches are in the initial position as shown in FIG. 2, the roll control system is engaged in the ready state for control wheel steering in the force-rate mode of operation. A pilot applied force to effect a roll maneuver causes a rate signal from integrator 58A proportional to said force to control, through command modifier 296, attitude limiter 300 and amplifier 24A, the servomotor 28A which drives the control surface 232 at a rate toward a displacement. At aircraft roll attitudes above the predetermined threshold level of threshold device 312, relay 316 is energized and automatically disconnects the compass system 270. Upon release of pilot applied force relay 42A becomes deenergized opening switch 44A. Further, if the pilot releases the applied force while the aircraft is above the roll limit, whereby threshold device 312 is operative, relay 316 remains energized so as to maintain switches 282 and 246 open. Upon release of pilot applied force, the switch 44A, as aforementioned, automatically opens. Thereafter the signal at conductor 60A corresponds to the signal thereof at the instant switch 44A opens. The command signal 60A is thereafter cancelled at summing device 20A by the signal from attitude gyro 69A at the newly acquired attitude, and the motor 28A drives the surface 232 to streamline so that the aircraft maintains its newly acquired attitude. Thus is derived the system memory to maintain the newly acquired attitude as a result of pilot applied wheel force about the roll axis.

However, when the pilot releases the force on the control wheel and the aircraft is at a roll attitude less than the attitude threshold of threshold device 312, the aircraft will roll to wings level at a new reference heading engaged by the compass system when switch 282, previously opened by relay 316 is again closed upon deenergization of relay 316. The aircraft return to wings level is accomplished by having the integrator 58A "rundown" to zero signal output. In particular, the integrator signal on line 60A is fed back through conductor 230, gain adjusted by gain adjusting device 237 and applied through conductor 234, switch 246, contact 248, summing device 254 and conductors 256 and 56A to integrator 58A, which effects a gradual signal decay on line 60A back to zero. Thereafter, the signals from compass system 270 command the aircraft to hold the newly acquired heading.

The short term force-displacement control wheel steering may be engaged during beam coupled approach by the pilot closing the switch 124A which thereupon, through linkage 127A, closes the switches 74A and 240. Since the pilot may engage the force-displacement channel and localizer channel while the aircraft is at a steep roll attitude from wings level, at which attitude the relay 316 would be energized and switch 246 would be opened, the switch 240 being closed provides an alternate integrator feedback path through the line 258. Thus, command signals effected by force on the control wheel may also effect, by operation of threshold device 36A and relay 42A, the closing of switch 44A. However, signals will not be conducted to summation device 292 since the rate signal is constantly cancelled out at the input of integrator 58A by the feedback path. The signal from localizer receiver 320 is summed at summing device 292 with the displacement signal proportional to the force applied at the control wheel. The summation signal is conducted via command modifier 296 and limiter 300 and combined with the summation of signals from rate gyro 68A and attitude gyro 69A signals and the combined signal is applied to command the displacement of surface 232. The gain adjusting device 237, which is conductive when either one or both of the feedback paths through switches 246 or 240, respectively, are closed, permits a high follow-up feedback signal so that "run-down" of the integrator to zero output at line 60A occurs rapidly. The rate of decay of the signal on line 60A will not cause an unsafe roll attitude rate since said rate cannot exceed the signal decay rate of command modifier 296.

The present invention provides means for automatic control of an aircraft, means for steering the craft about the pitch and roll axes in response to pilot applied force to the control wheel and means effective, upon release of the wheel, to thereafter maintain the aircraft at the new attitude or, alternatively, to return he aircraf to the initial attitude acquired before the pilot applied the force. Although the invention shows mechanical switches, operator-operative or electromechanically operative, it is within the contemplation of the invention that electronic switching circuits may be utilized to provide the logic functions therein.

While two embodiments of the invention have been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. Apparatus for controlling an aircraft in response to the force exerted by the pilot on a control element of the craft, comprising
   a transducer connected to the control element for providing a signal corresponding to the force applied thereto
   first means connected to the transducer for adjusting the gain of the signal therefrom;

second means connected to the transducer for adjusting the gain of the signal therefrom;
an integrator connected to the first gain adjusting means;
a lag circuit connected to the second gain adjusting means;
means for providing an aircraft attitude signal;
means for providing an attitude rate signal;
signal combining means connected to the integrator, the lag circuit, the attitude signal means and the attitude rate signal means for combining the signals therefrom to provide a control signal; and
means connected to the signal combining means and responsive to the signal therefrom for controlling the craft.

2. Apparatus as described by claim 1, including:
an attitude controller;
a normally open first switch connected to the attitude controller and connected to the signal combining means;
a normally closed second switch connecting the transducer to the first gain adjusting means; and
a threshold device connected to the attitude controller and connected to the first and second switches, and effective upon operation of the controller for closing the first switch to connect the controller to the signal combining means and for opening the second switch to disconnect the transducer from the first gain adjustment device.

3. Apparatus as described by claim 2, including:
a normally closed third switch connecting the second gain adjustment means to the lag circuit; and
the threshold device connected to the third switch and effective upon operation of the attitude controller for opening the third switch to disconnect the second gain adjustment device from the lag circuit.

4. Apparatus as described by claim 1, including:
a normally open first switch connected to the transducer and connected to the first gain adjustment device; and
a threshold device connected to the transducer and connected to the first switch and effective upon the signal from the transducer exceeding a predetermined limit for closing the first switch to connect the transducer to the first gain adjustment device.

5. Apparatus as described by claim 1, including:
a normally open first switch connected to the second gain adjusting means and connected to the lag circuit;
means for providing a signal corresponding to the displacement of the craft from a predetermined reference;
a normally open second switch connected to the displacement signal means and to the signal combining means; and
the first and second switches being operably connected so that when said second switch is closed to connect the displacement signal means to the signal combining means the first switch closes to connect the second gain adjusting means to the lag circuit.

6. Apparatus as described by claim 5, including:
a normally closed third switch connecting the first gain adjustment means to the integrator; and
the third switch being operably connected to the second switch so that when said second switch is closed said third switch opens to disconnect the first gain adjustment means from the integrator.

7. Apparatus as described by claim 5, having an attitude controller wherein the signal combining means includes:
first combining means connected to the attitude controller, to the displacement signal means and to the lag circuit for combining the signals therefrom;
second combining means connected to the integrator and to the first combining means for combining the signals therefrom;
third combining means connected to the attitude signal means and to the attitude rate signals means for combining the signals therefrom;
a third gain adjustment device connected to the transducer; and
fourth combining means connected to the second combining means to the third combining means and to the third gain adjustment device for combining the signals therefrom to provide the control signal.

8. Apparatus as described by claim 5, including:
third gain adjustment means connected to an output of the integrator;
a normally open third switch connected to an output of the third gain adjustment means and connected to an output of the first gain adjustment means, and operably connected to the second switch so that when the second switch closes the third switch closes to connect the outputs of said first and third gain adjustment means.

9. Apparatus as described by claim 8 including:
means for providing a signal corresponding to the heading of the craft;
a normally closed fourth switch connecting an output of the first gain adjustment means to an output of the third gain adjustment means;
a normally closed fifth switch connecting the heading signal means to the signal combining means; and
a threshold device connected to the attitude signal means and connected to the fourth and fifth switches and effective upon the attitude signal exceeding a predetermined limit for opening said fourth and fifth switches.

10. Apparatus as described by claim 9, wherein: the fourth switch is connected to the eighth switch.

11. Apparatus as described by claim 9, having an attitude controller wherein the signal combining means includes:
first combining means connected to the heading signal means, the displacement signal means, the attitude controller, the integrator and the lag circuit for summing the signals therefrom;
means connected to the first combining means for modifying the signal therefrom;
a limiter connected to the modifier for limiting the modified signal;
a fourth gain adjustment device connected to the transducer;
second combining means connected to the attitude signal means and the attitude rate signal means for combining the signals therefrom; and
third combining means connected to the fourth gain adjustment device, to the limiter and to the second combining means for summing the signals therefrom and for providing the control signal.

References Cited

UNITED STATES PATENTS

| | | | |
|---|---|---|---|
| 3,033,496 | 5/1962 | Brands | 244—77 |
| 3,266,040 | 8/1966 | Doniger et al. | 244—77 X |
| 3,386,689 | 6/1968 | Parker et al. | 244—77 |

FERGUS S. MIDDLETON, Primary Examiner

U.S. Cl. X.R.

318—489